United States Patent [19]

Eisbrenner et al.

[11] Patent Number: 4,610,892

[45] Date of Patent: Sep. 9, 1986

[54] METHOD FOR PRODUCING A DIRECTED AEROSOL STREAM

[75] Inventors: Dietrich Eisbrenner, Ulm; Hans Merk, Ulm/Gögglingen, both of Fed. Rep. of Germany

[73] Assignee: Licentia Patent-Verwaltungs-GmbH, Frankfurt am Main, Fed. Rep. of Germany

[21] Appl. No.: 778,081

[22] Filed: Sep. 20, 1985

[30] Foreign Application Priority Data

Sep. 21, 1984 [DE] Fed. Rep. of Germany ....... 3434674

[51] Int. Cl.$^4$ ............................................. B05D 1/06
[52] U.S. Cl. ........................................ 427/27; 65/3.11; 65/3.12; 65/3.20; 427/162; 427/163; 427/166; 427/167; 427/168
[58] Field of Search ................. 427/27, 162, 163, 166, 427/167, 168; 65/3.12, 3.2, 3.11

[56] References Cited

U.S. PATENT DOCUMENTS

| | | | |
|---|---|---|---|
| 4,083,708 | 4/1978 | Heath et al. ........................ | 65/3.2 X |
| 4,090,055 | 5/1978 | King .................................. | 65/3.2 |
| 4,224,046 | 9/1980 | Izawa et al. ........................ | 65/3 A |
| 4,233,045 | 11/1980 | Sarkar ............................... | 65/3.12 |
| 4,378,987 | 5/1983 | Miller et al. ....................... | 65/3.12 |
| 4,440,558 | 4/1984 | Nath et al. ........................ | 65/3.12 |

Primary Examiner—Thurman K. Page
Attorney, Agent, or Firm—Spencer & Frank

[57] ABSTRACT

A method for producing a directed aerosol stream from gaseous and/or vapor phase reactants by conveying the gaseous and/or vapor phase reactants including vaporous silicon tetrachloride, water vapor, and at least one vaporous, fluorine-containing hydrocarbon to a reaction site; reacting the reactants at the reaction site in a flame-free chemical reaction to produce an aerosol composition constituted of solid silicon dioxide particles which include silicon dioxide doped with fluorine, whereby the optical index of refraction of the solid silicon dioxide particles is reduced; and causing the aerosol composition to flow as an aerosol stream from the reaction site and immediately surrounding the aerosol stream with a moving, essentially aerosol-free, gas and/or vapor stream to form a directed aerosol stream enveloped in the aerosol-free stream.

5 Claims, 1 Drawing Figure

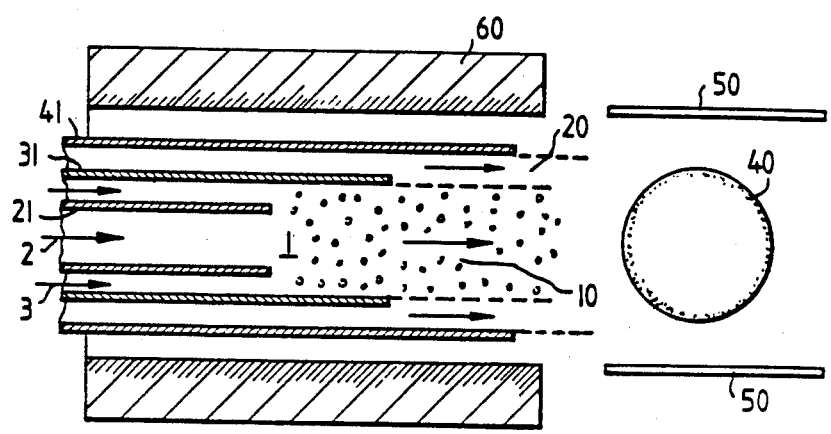

METHOD FOR PRODUCING A DIRECTED AEROSOL STREAM

BACKGROUND OF THE INVENTION

1. Field of the Invention

The present invention relates to a method for producing a directed aerosol stream for coating substrates, and in particular to a method wherein an aerosol stream is produced from a gas and/or vapor mixture by way of a flame-free chemical reaction and is surrounded by a moving, essentially aerosol-free gas and/or vapor stream to form a directed aerosol stream enveloped in the aerosol-free stream.

2. Discussion of the Art

Aerosols are supsensions of solid or liquid particles in a gas, the particles often being in the colloidal size range. Aerosols containing solid particles are referred to as soots or fumes and aerosols containing gases or vapors as well as liquid particles are called fogs. An exemplary process for producing a flowing aerosol, hereinafter referred to as an aerosol stream, provides that gaseous and/or vaporous chemical components are mixed with the aid of a diffusion process and/or a turbulent mixing process and the resulting gas and/or vapor mixture is converted by thermal reaction, e.g. flame hydrolysis, into an aerosol stream.

In conventional aerosol streams, the solid or liquid particles move at various angles and in various directions. An aerosol stream of this sort is often uneconomical to use when a directed stream is needed, e.g., in manufacturing facilities which do coating, where it is desirable that only the articles to be coated are covered and not the surroundings. Such a conventional aerosol stream may be directed by mechanical means, e.g., using baffles. However, this procedure is uneconomical since the baffles are also coated by the aerosol particles, which result in losses of the aerosol and requires expensive cleaning procedures.

In copending, commonly assigned, U.S. patent application Ser. No. 632,291 by Reinhard Kühne and Max Kuisl, filed July 19, 1984, the disclosure of which is herein incorporated by reference, a method for producing a directed aerosol stream is provided which results in an economically manageable aerosol stream having a high particle density and which is suitable, in particular, for coating systems.

The method is particularly suited for the production of so-called preforms for optical fibers made of quartz glass. For this purpose, gaseous silicon tetrachloride ($SiCl_4$) is reacted in a flame-free chemical reaction in a reactor with water vapor ($H_2O$), preferably at 500° C. to 1000° C., so as to produce an aerosol composition containing silicon dioxde ($SiO_2$) particles. A directed aerosol stream is produced by causing the aerosol composition to flow as an aerosol stream and enveloping the aerosol stream in an essentially aerosol-free gas and/or vapor stream by which it is conducted and directed. A rod-shaped substrate is disposed in the directed aerosol stream and the $SiO_2$ particles are coated or precipitated, in the form of one or more layers, on this substrate.

Optical preforms may require layers having different optical indices of refraction to thereby provide a refractive index gradient or profile. The index of refraction may be increased by adding hydrolyzable substances, e.g., germanium tetrachloride ($GeCl_4$), to the gaseous silicon tetrachloride ($SiCl_4$) in the reactor which result in the formation of doped, e.g., germanium doped, silicon dioxide particles.

In the prior art method, $SiO_2$ particles are produced by a hydrolysis reaction accroding to the following formula:

$$SiCl_4 + 2H_2O \rightarrow SiO_2 + 4HCl \tag{1}$$

Doping of $SiO_2$ particles produced in this manner is taught as possible only with doping substances which can be incorporated in the quartz matrix under the above-mentioned reaction conditions. Such a hydroloyzable substance is, for example, germanium chloride ($GeCl_2$), which results in germanium doping of the silicon dioxide particles produced and increases the optical index of refraction thereof. This doping takes place with the aid of a hydrolysis reaction which takes place analogously to Formula (1) and according to the following formula:

$$GeCl_4 + 2H_2O \rightarrow GeO_2 + 4HCl \tag{2}$$

However, in order to fabricate an optical fiber having an optical index of refraction gradient or profile which varies broadly, it is desirable that the optical index of refraction of the $SiO_2$ be reduced by doping with a substance which may be introduced into the $SiO_2$ particles in the aforementioned prior art flame-free process.

SUMMARY OF THE INVENTION

It is the object of the present invention to dope the $SiO_2$ particles contained in a directed aerosol stream made by a flame-free chemical reaction so that the optical index of refraction of the $SiO_2$ is reduced.

This object is accomplished in a method for producing a directed aerosol stream in which gaseous and/or vapor phase reactants including vaporous silicon tetrachloride and water vapor are conveyed to a reaction site in a reaction chamber; the reactants are reacted at the reaction site in a flame-free chemical reaction to produce an aerosol composition comprised of solid silicon dioxide particles; and the aerosol composition is caused to flow as an aerosol stream from the reaction site and the aerosol stream is immediately surrounded with a moving, essentially aerosol-free, gas and/or vapor stream to form a directed aerosol stream enveloped in the aerosol-free stream, by the improvement comprising:

- including in the gaseous and/or vapor phase reactants to be conveyed to the reaction site at least one vaporous, fluorine-containing hydrocarbon,
- whereby the solid silicon dioxide particles of the aerosol composition comprise silicon dioxide doped with fluorine and the optical index of refraction thereof is reduced.

Advantageously, when dichlorodifluoromethane, $CF_2Cl_2$, is employed as the vaporous, fluorine-containing hydrocarbon, the resulting fluorine dopant is believed incorporated in the silicon dioxide particles and not merely surface adsorbed thereon, as will be demonstrated in the following. Further, a high fluorine concentration is obtained in the silicon dioxide particles when $CF_2Cl_2$ is employed so that it becomes possible to reduce the optical index of refraction considerably and thereby provide a lightwave conductor having an optical index of refraction gradient or profile which may vary broadly.

BRIEF DESCRIPTION OF THE DRAWING

The FIGURE is a sectional side view of an aerosol generator usable in practicing the invention.

DESCRIPTION OF THE PREFERRED EMBODIMENT

The present invention will now be described in greater detail with the aid of an embodiment and with reference to the drawing.

The Figure illustrates an aerosol generator substantially as taught in the aforementioned U.S. patent application Ser. No. 632,291 by Kühne et al (hereinafter referred to as the Küne et al Application), which includes concentrically arranged pipes or conduits 21, 31, and 41, each having a cross-section which is adapted to the intended use of the generated aerosol stream. For example, the cross-section of the conduits may be selected to be circular or rectangular. The inner conduits 21 and 31 initially conduct gaseous and/or vaporous components in laminarly flowing streams symbolized by arrows 2 and 3, into a reaction chamber 1.

In reaction chamber 1, diffusion produces a gas and/or vapor reactant mixture, which mixture is converted by chemical reaction into an aerosol composition, the aerosol stream 10. This chemical reaction may be initiated, for example, by the heat generated in a furnance 60 arranged around reaction chamber 1. The resulting, essentially laminarly flowing aerosol stream 10 is then surrounded by an envelope of an aerosol-particle-free gas and/or vapor stream 20, which is introduced through the outer concentric conduit 41 and conducts, i.e., directs, the aerosol stream 10.

The gas and/or vapor stream 20 is in essentially laminar flow and prevents radial movement of the particles contained in the aerosol stream 10. This makes it possible, particularly in coating systems, to shape the cross-section of the aerosol stream 10 by way of nozzles to precisely direct the aerosol stream and to make the coating processes more economical. The particle-free gas and/or vapor stream 20, in particular, prevents clogging of the nozzles, the walls of the reaction chamber, and some eventually necessary baffles by preventing the aerosol from contacting the appropriate surfaces and thus avoids costly cleaning work. The shape of the nozzle may be calculated and/or experimentally determined according to the body 40 that is to be coated. E.g., for the manufacturing of so called preforms for optical fibers it is necessary to coat the outer surface of a rod-shaped substrate, e.g., a bar-like body, with several glass-forming layers. For this purpose, the end of the outer concentric conduit 41 preferably has a nozzle that is part of a conduit with a rectangular crosssectional area. This cross-sectional area has the same length and the same width as the rod-shaped substrate.

The substrate or body 40 to be coated may be surrounded by aerodynamic guide elements 50 in such a manner that almost all particles contained in aerosol stream 10 impinge on body 40 and in this manner permit economical coating. To enhance the rate of precipitation and reduce waste, the Kühne et al Application advises that it is possible to generate an electrical field between body 40 and guide elements 50 by which the particles contained in aerosol stream 10 are guided onto body 40. If these particles are of a dielectric nature, e.g., $SiO_2$, it is possible to form the electrical field in such a manner that electrical dipoles are produced in the particles which enhance the coating of body 40.

The Kühne et al Application describes a method which can be used, inter alia, to make a preform that is employed for producing light waveguides i.e., optical fibers, made of quartz glass which may be doped. For this purpose body 40 may be a graphite rod which is rotated on its longitudinal axis and simultaneously coated with glass soot along its length. The glass soot, which coats or precipitates on the rod, is provided by a directed aerosol stream which contains the glass soot and which has a cross-section adapted to that of the rod. After precipitation of the glass soot, sintering takes place so that a quartz glass tube is produced and an optical fiber can be drawn from the tube according to techniques which are well known in the art.

The improvement according to the present invention will now be described in greater detail with the aid of the following example in which $SiO_2$ particles were produced in a test series. The particles had a diameter of about 0.3 microns. Various fluorine-containing gases and/or vapors were added to the silicon tetrachloride ($SiCl_4$) in certain ratios and the resulting glass soot examined for its fluorine content. The results are shown in the Table below:

| Fluorine-containing Compound | Mole % F/Si in the starting gases | Mole % F/Si in the sample | Type of Sample | modification of refractive index $\Delta n/n$ in % |
|---|---|---|---|---|
| $CF_2Cl_2$ | 8.2 | 1.8 | soot | 0.57 |
| $CF_2Cl_2$ | 8.2 | 1.0 | sintered soot (1500° C.) | 0.35 |
| $CF_2Cl_2$ | 8.2 | 1.0 | sintered soot (1580° C.) | 0.35 |
| $CF_4$ | 19.6 | 0.03 | soot | |
| $SF_6$ | 65.7 | 0.03 | soot | |

Inclusion of gaseous $CF_4$ and $SF_6$ as the substances used to introduce fluorine dopant into the $SiO_2$ particles resulted only in negligible fluorine doping, most probably because these gases do not noticeably decompose at 700° C., the temperature used herein. Of the gases and/or vapors employed in the test series, only $CF_2Cl_2$ resulted in a significant doping effect. An unexpectedly large reduction in the optical index of refraction was obtained when $CF_2Cl_2$ was used to introduce fluorine dopant into the $SiO_2$. With the measured fluorine doping ranging from 1.0 to 1.8 mole %, the optical index of refraction of $SiO_2$ was found to be reduced by 0.35% to 0.57%. Such a reduction is within the preferred order of magnitude for fabricating optical fibers having optical index of refraction gradients or profiles.

Notable also is that the fluorine content, before and after the sintering process, remains substantially intact, i.e., 1.8 mole % and 1.0 %, respectively. This suggests that fluorine has indeed been incorporated into the $SiO_2$ particles and is not present only as a surface-type adsorbant; a most desirable result.

Although $CF_2Cl_2$ produced the best doping effect of the three fluorine-containing organic materials used to produce soots at 700° C., other fluorine-containing organic materials, especially fluorine-containing hydrocarbons, are expected to be useful as substances for introducing fluorine dopant into $SiO_2$, whereby the optical index of refraction is reduced. The primary selection criteria include that the material contain fluorine, be introducible as a vapor into the reaction chamber of an aerosol generator, and react or decompose at a temperature below the fusion temperature of SiO$_2$, preferably within the temperature range of from 500° to 1,000° C.

More specifically, the test series of SiO$_2$ particles was produced in an aerosol generator as follows. A reaction chamber 1, having a cross-sectional area of 5.3 cm$^2$, was heated to about 700° C. Nitrogen (N$_2$) was used as a carrier gas and was introduced into conduits 21 and 31 at a flow rate of about 28 liter/hr. Gaseous SiCl$_4$ was introduced into conduit 21 at a flow rate of about 5 liter/hr, along with the carrier gas and one of various fluorine-containing, organic gases and/or vapors, introduced at a flow rate of 0.5 liter/hr. Water vapor was introduced into conduit 31 at a flow rate of about 10 liter/hr along with 40 liter/hr carrier gas. These reactants were fed into reaction chamber 1 where they were mixed and reacted at 700° C. to produce an aerosol stream 10. In the reaction chamber 1, there was a resultant velocity of flow of about 5 cm/sec. Aerosol stream 10, exiting the reaction chamber 1, was surrounded by an aerosol-particle-free gas and/or vapor stream 20 which consisted of gaseous N$_2$ at a flow rate of about 130 liter/hr. The resulting directed aerosol stream was caused to impinge on a rotating body 40 and the silicon dioxide particles precipitated onto the carrier body 40 as a coating. The chemical reaction produced fluorine-doped SiO$_2$ particles or glass soots with a diameter of about 0.3 microns and a particle density of about 5×10$^{10}$ particles/cm$^3$.

The flow rate of the fluorine-containing, organic gas and/or vapor may be altered, however, to produce the desired optical index of refraction profile in the resulting optical fiber since the desired relation of fluorine to SiO$_2$ in the preform layers is related to the adjustable relation of fluorine-containing gas and/or vapor to gaseous SiCl$_4$. Further, the respective flow rates within conduits 21, 31, and 41 may be selected in such a manner that, on the one hand, a laminar flow is maintained but, on the other hand, re-diffusion from reaction chamber 1 into the conduits is avoided. This prevents undesirable particle deposition in conduits 21, 31, and 41.

Apparatus and method variations on the flame-free method according to the Kühne et al Application are to be considered as comprehended within the meaning and range of equivalents of the appended claims. It will be understood that the above description of the present invention is susceptible to various modifications, changes and adaptations, and the same are intended to be comprehended within the meaning and range of equivalents to the appended claims.

What is claimed is:

1. In a mehtod for producing a directed aerosol stream from gaseous and/or vapor phase reactants by conveying the gaseous and/or vapor phase reactants including vaporous silicon tetrachloride and water vapor to a reaction site in a reaction chamber; reacting the reactants at the reaction site in a flame-free chemical reaction to produce an aerosol composition comprised of solid silicon dioxide particles; and causing the aerosol composition to flow as an aerosol stream from the reaction site and immediately surrounding the aerosol stream with a moving, essentially aerosol-free, gas and/or vapor stream to form a directed aerosol stream enveloped in the aerosol-free stream, the improvement comprising:

including in the gaseous and/or vapor phase reactants to be conveyed to the reaction site at least one vapourous, fluorine-containing hydrocarbon, whereby the solid silicon dioxide particles of the aerosol composition comprise silicon dioxide doped with fluorine and the optical index of refraction thereof is reduced.

2. The improved method according to claim 1, wherein the fluorine-containing hydrocarbon is dichlorodifluoromethane.

3. The improved method according to claim 1, wherein the flame-free chemical reaction takes place at a temperature ranging from 500° to 1,000° C.

4. The improved method according to claim 1, wherein the solid silicon dioxide particles of the aerosol composition comprise from 1.0 to 1.8 mole percent of fluorine with respect to silicon.

5. The improved method according to claim 1, wherein the silicon dioxide particles of the aerosol composition comprise an amount of fluorine sufficient to reduce the optical index of refraction thereof by from 0.35 to 0.57 percent.

* * * * *